(12) United States Patent
Tanioka et al.

(10) Patent No.: US 11,563,892 B2
(45) Date of Patent: Jan. 24, 2023

(54) EDGE DETECTION SIGNAL PROCESSING

(71) Applicant: SONY GROUP CORPORATION, Tokyo (JP)

(72) Inventors: Shun Tanioka, Kanagawa (JP); Koji Kamiya, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/242,903

(22) Filed: Apr. 28, 2021

(65) Prior Publication Data

US 2021/0250499 A1 Aug. 12, 2021

Related U.S. Application Data

(63) Continuation of application No. 16/690,497, filed on Nov. 21, 2019, now Pat. No. 11,025,818, which is a (Continued)

(30) Foreign Application Priority Data

Apr. 7, 2015 (JP) .............................. JP2015-078632

(51) Int. Cl.
*H04N 5/232* (2006.01)
*H04N 5/208* (2006.01)
*H04N 5/243* (2006.01)

(52) U.S. Cl.
CPC ......... *H04N 5/23235* (2013.01); *H04N 5/208* (2013.01); *H04N 5/23212* (2013.01); (Continued)

(58) Field of Classification Search
CPC ............... H04N 5/23235; H04N 5/208; H04N 5/23212; H04N 5/232123; H04N 5/23293; H04N 5/232945; H04N 5/243
See application file for complete search history.

(56) References Cited

U.S. PATENT DOCUMENTS

| 5,212,516 A | 5/1993 | Yamada |
| 8,692,899 B2 | 4/2014 | Haruta |
| (Continued) | | |

FOREIGN PATENT DOCUMENTS

| JP | 4-358479 A | 12/1992 |
| JP | 5-41819 A | 2/1993 |
| JP | 6-141223 A | 5/1994 |

OTHER PUBLICATIONS

International Search Report dated Jul. 5, 2016 in PCT/JP2016/060976, 4 pages.

(Continued)

*Primary Examiner* — Padma Haliyur
(74) *Attorney, Agent, or Firm* — Oblon, McClelland, Maier & Neustadt, L.L.P.

(57) ABSTRACT

To satisfactorily detect an edge detection signal of a high frequency band from a captured image signal at all times. A filtering unit extracts an edge detection signal of a high frequency band from an image signal obtained from imaging, and a band control unit controls the high frequency band on the basis of lens information. For example, the filtering unit includes a first high-pass filter with a first cutoff frequency, a second high-pass filter with a second cutoff frequency that is lower than the first cutoff frequency, and an α blending unit that performs α blending on output of the first high-pass filter and output of the second high-pass filter. Even if the frequency of the edge detection signal included in the captured image signal varies due to a change in a zoom position, a lens model number, an F value or the like, the edge detection signal can be satisfactorily detected at all times.

17 Claims, 10 Drawing Sheets

Related U.S. Application Data continuation of application No. 15/554,759, filed as application No. PCT/JP2016/060976 on Apr. 1, 2016, now Pat. No. 10,506,152.

(52) U.S. Cl.
CPC ... *H04N 5/23293* (2013.01); *H04N 5/232123* (2018.08); *H04N 5/232945* (2018.08); *H04N 5/243* (2013.01)

(56) References Cited

U.S. PATENT DOCUMENTS

| | | |
|---|---|---|
| 8,724,919 B2 | 5/2014 | Pillman |
| 2003/0063212 A1* | 4/2003 | Watanabe ........ H04N 5/232123 348/E5.045 |
| 2007/0052836 A1* | 3/2007 | Yamada ................ G06T 7/13 348/E5.045 |
| 2014/0347557 A1 | 11/2014 | Gomita |
| 2015/0326797 A1* | 11/2015 | Ohyama ................ H04N 5/265 348/239 |
| 2017/0193643 A1 | 7/2017 | Naruse |

OTHER PUBLICATIONS

Japanese Office Action dated Jun. 2, 2020 in Patent Application No. 2017-510970, 4 pages.

* cited by examiner

EDGE DETECTION SIGNAL PROCESSING

CROSS-REFERENCE TO RELATED APPLICATIONS

This application is a continuation of U.S. application Ser. No. 16/690,497, filed Nov. 21, 2019, which is a continuation of U.S. application Ser. No. 15/554,759, filed Aug. 31, 2017, which is a National Stage of International Application No. PCT/JP2016/060976, filed Apr. 1, 2016, and claims priority to Japanese Application No. 2015-078632, filed Apr. 7, 2015. The entire contents of each of which are incorporated herein by reference.

TECHNICAL FIELD

The present technology relates to an image signal processing device, an image signal processing method, and an imaging device, and particularly to an image signal processing device and the like for extracting an edge detection signal of a high frequency band from a captured image signal.

BACKGROUND ART

General cameras (imaging devices) include viewfinders (display devices) for checking the composition and focus of captured images in real time. It is required with respect to captured images displayed on viewfinders to fully reproduce the angles of view and resolution of the images depending on purposes thereof. However, there are many cases, for example, in which viewfinders with HD resolution or the like which is lower than the resolution of captured images are used in high-resolution imaging devices (e.g., 4K cameras) for the reason of convenience in handling and installation.

The present applicant has proposed a technology for displaying edge information of a high-resolution image on a low-resolution display device before (refer to Patent Literature 1). This technology intends to enable focusing to be checked from edge information of a higher frequency band than a Nyquist frequency of low resolution by down-converting high frequency edge information, which is obtained by performing a filtering process on a high-resolution image, and displaying the edge information on the low-resolution display device.

CITATION LIST

Patent Literature

Patent Literature 1: JP 2014-230176A

DISCLOSURE OF INVENTION

Technical Problem

Frequency bands that a high-resolution image can express significantly change depending on a lens state (a lens model number, a zoom position, or an F number). For this reason, when frequency bands are fixed to extract high frequency edge information from a high-resolution image, it may be difficult to obtain the high frequency edge information depending on a lens state.

An objective of the present technology is to enable an edge detection signal of a high frequency band to be easily detected from a captured image signal at all times.

Solution to Problem

A concept of the present technology is
an image signal processing device including:
a filtering unit configured to extract an edge detection signal of a high frequency band from an image signal obtained from imaging; and
a band control unit configured to control the high frequency band on the basis of lens information.

In the present technology, the filtering unit extracts the edge detection signal of the high frequency band from the image signal obtained from imaging. Then, the band control unit controls the high frequency band on the basis of the lens information. The lens information may at least include, for example, zoom position information.

For example, the filtering unit may include a first high-pass filter with a first cutoff frequency, a second high-pass filter with a second cutoff frequency that is lower than the first cutoff frequency, and an $\alpha$ blending unit that performs $\alpha$ blending on output of the first high-pass filter and output of the second high-pass filter. In this case, for example, the band control unit may control at least an $\alpha$ value of the $\alpha$ blending on the basis of the lens information.

In the present technology described above, the high frequency band for extracting the edge detection signal from a captured image signal is controlled on the basis of the lens information. Thus, even if the frequency of the edge detection signal included in the captured image signal varies due to a change in a zoom position, a lens model number, an F value or the like, the edge detection signal can be satisfactorily detected at all times.

Note that, according to the present technology, for example, the image signal processing device may further include a gain control unit configured to control a gain of the edge detection signal extracted by the filtering unit on the basis of the lens information. Even if the gain of the extracted edge detection signal varies due to a change in a zoom position, a lens model number, an F value or the like, the gain of the edge detection signal can be stabilized by controlling the gain on the basis of the lens information as described above.

In addition, according to the present technology, for example, the image signal processing device may further include: a coring unit configured to reduce noise included in the edge detection signal extracted by the filtering unit; and a coring level control unit configured to control a coring level of the coring unit on the basis of imaging information, correction information, and gain information. A noise component included in the extracted edge detection signal can be effectively reduced by controlling a coring level on the basis of imaging information, the correction information, and gain information as described above.

In addition, another concept of the present technology is
an image signal processing method including:
a step of performing a down-conversion process on an image signal with a first resolution obtained from imaging and generating an image signal with a second resolution that is lower than the first resolution;
a step of extracting an edge detection signal of a high frequency band from the image signal with the first resolution;
a step of controlling the high frequency band on the basis of lens information;
a step of performing a down-conversion process on the extracted edge detection signal and obtaining an edge detection signal with the second resolution; and a step of combining the obtained edge detection signal with the generated image signal with the second resolution and obtaining an image signal with the second resolution for display.

In the present technology, the down-converting unit performs the down-conversion process on the image signal with the first resolution obtained from imaging and thus generates the image signal with the second resolution that is lower than the first resolution. For example, the first resolution may be 4K resolution and the second resolution may be HD resolution.

The filtering unit extracts the edge detection signal of the high frequency band from the image signal with the first resolution. Then, the band control unit controls the high frequency band on the basis of the lens information. The lens information may at least include, for example, zoom position information.

For example, the filtering unit may include a first high-pass filter with a first cutoff frequency, a second high-pass filter with a second cutoff frequency that is lower than the first cutoff frequency, and an α blending unit that performs α blending on output of the first high-pass filter and output of the second high-pass filter. In this case, for example, the band control unit may control at least an α value of the α blending on the basis of the lens information.

The high frequency band edge detection unit performs the down-conversion process on the edge detection signal extracted by the filtering unit and thereby obtains the edge detection signal with the second resolution. Then, the combining unit combines the edge detection signal obtained by the high frequency band edge detection unit with the image signal with the second resolution generated by the down-converting unit and thereby obtains an image signal with the second resolution for display.

In the present technology described above, the high frequency band for extracting the edge detection signal from the image signal with the first resolution as a captured image signal is controlled on the basis of lens information. Thus, even if a frequency of the edge detection signal included in the image signal with the first resolution varies due to a change in a zooming magnification, a lens model number, an F value, or the like, the edge detection signal can be satisfactorily detected at all times, and thus edge information can be satisfactorily displayed with high resolution on a display device, and the focus of a high-resolution camera can be accurately adjusted using the display of a low-resolution viewfinder.

In addition, another concept of the present technology is an imaging device including:

an imaging unit configured to obtain an imaging signal with a first resolution; and an image signal processing unit configured to process the image signal with the first resolution obtained by the imaging unit and obtain an image signal with a second resolution for viewfinder display, which is lower than the first resolution.

The image signal processing unit includes a down-converting unit configured to perform a down-conversion process on an image signal with the first resolution and generate an image signal with the second resolution that is lower than the first resolution, a filtering unit configured to extract an edge detection signal of a high frequency band from the image signal with the first resolution, a band control unit configured to control the high frequency band on the basis of lens information, a high frequency band edge detection unit configured to perform a down-conversion process on an edge detection signal extracted by the filtering unit and obtain an edge detection signal with the second resolution, and a combining unit configured to combine the edge detection signal obtained by the high frequency band edge detection unit with the image signal with the second resolution generated by the down-converting unit and obtain an image signal with the second resolution for display.

Advantageous Effects of Invention

According to the present technology, it is possible to satisfactorily detect an edge detection signal of a high frequency band from a captured image signal at all times. Note that the effects described in the present specification are merely examples, and not limitative; other effects may be exhibited.

MODE(S) FOR CARRYING OUT THE INVENTION

Exemplary embodiments for implementing the invention (each of which will also be referred to as an "embodiment" below) will be described below. Note that description will be provided in the following order.

1. First Embodiment
2. Second Embodiment
3. Third Embodiment
4. Modified example

1. First Embodiment

[Example of Configuration of Imaging Device]

Figure 1:
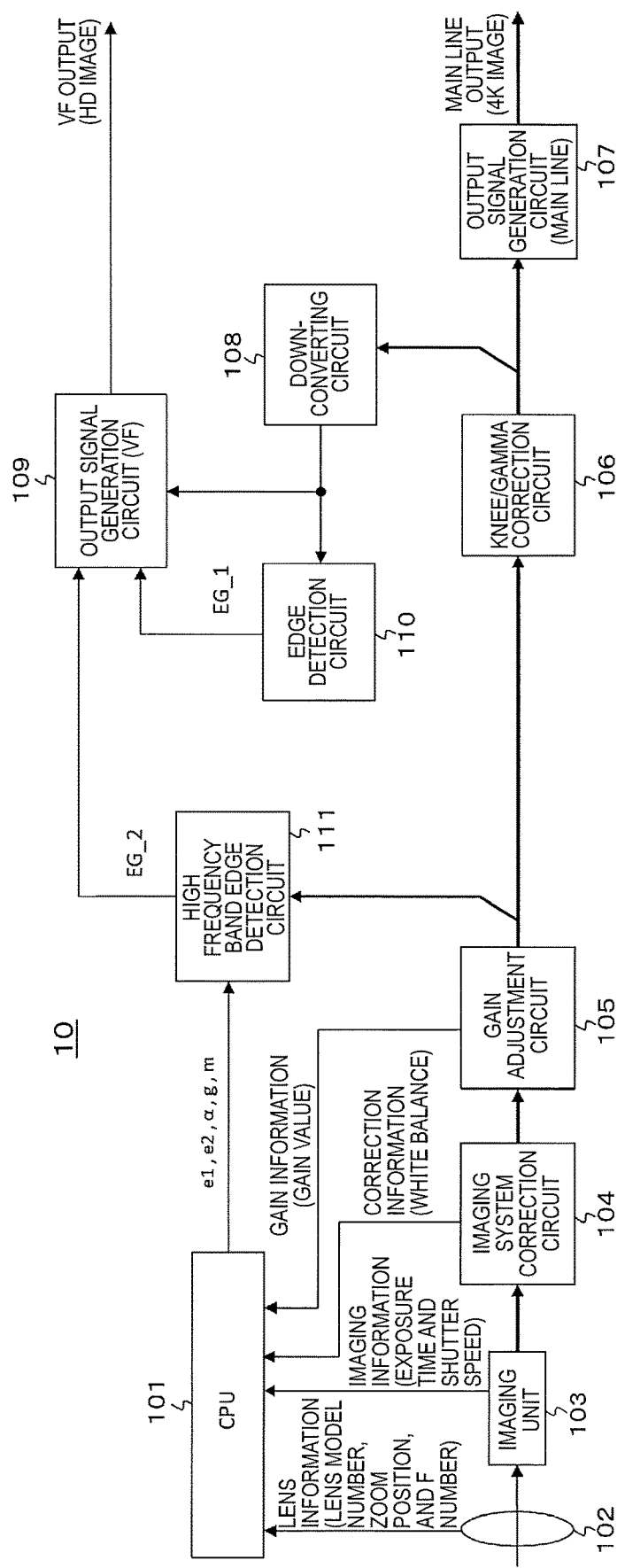
FIG. 1 is a block diagram illustrating an example of a configuration of an imaging device (a camera system) as a first embodiment.

FIG. 1 illustrates an example of a configuration of an imaging device (a camera system) 10 as a first embodiment. The imaging device 10 has a central processing unit (CPU) 101, a lens unit 102, an imaging unit 103, an imaging system correction circuit 104, a gain adjustment circuit 105, a knee/gamma correction circuit 106, and an output signal generation circuit 107 for main line output. In addition, the imaging device 10 further has a down-converting circuit 108, an output signal generation circuit 109 for a viewfinder, an edge detection circuit 110, and a high frequency band edge detection circuit 111.

The CPU 101 constitutes a control unit and controls operations of the units of the imaging device 10. The lens unit 102 concentrates light from a subject, which is not illustrated, on an imaging sensor (an image sensor) of the imaging unit 103. The imaging unit 103 is an imaging unit applicable to 4K resolution. For example, while HD resolution has 1920 pixels in the horizontal direction and 1080 pixels in the vertical direction, 4K resolution has 3840 pixels in the horizontal direction and 2160 pixels in the vertical direction. The imaging unit 103 receives light from the subject on the imaging sensor, performs photo-electric conversion and A/D conversion, and outputs a captured image signal.

The imaging system correction circuit 104 performs imaging system correction on the captured image signal output from the imaging unit 103, such as white balance correction, aberration correction, and shading correction. The gain adjustment circuit 105 performs gain adjustment on the captured image signal corrected by the imaging system correction circuit 104. The knee/gamma correction circuit 106 performs knee correction for causing an output signal to comply with a signal standard and gamma correction for handling monitor gamma on the gain-adjusted captured image signal. The output signal generation circuit 107 converts the captured image signal that has been corrected by the knee/gamma correction circuit 106 to have a final output format and outputs the image signal to an outside as main line output of a 4K image.

The down-converting circuit 108 performs a down-conversion process (a resolution conversion process) on the captured image signal corrected by the knee/gamma correction circuit 106 and generates an image signal of HD resolution. The output signal generation circuit 109 converts the image signal of HD resolution obtained from the down-conversion process to have an output format that is suitable for the viewfinder (a display device) on the output side and outputs the image signal to the outside as viewfinder output of an HD image.

The edge detection circuit 110 obtains an edge detection signal with HD resolution on the basis of the image signal with HD resolution obtained by the down-converting circuit 108. Specifically, the edge detection circuit 110 performs, for example, a high-pass filtering process on the image signal with HD resolution for each pixel and calculates the edge detection signal of HD resolution. The edge detection circuit 110 constitutes a low-frequency band edge detection circuit.

The high frequency band edge detection circuit 111 obtains an edge detection signal with HD resolution on the basis of the captured image signal with 4K resolution whose gain has been adjusted by the gain adjustment circuit 105. Specifically, the high frequency band edge detection circuit 111 extracts the edge detection signal of a high frequency band from the captured image signal with the 4K resolution, performs a down-conversion process on the edge detection signal, and thereby obtains an edge detection signal with HD resolution.

In this embodiment, the CPU 101 receives supply of lens information (e.g., information of a lens model number, a zoom position, an F number, and the like) from the lens unit 102. In addition, the CPU 101 receives supply of imaging information (e.g., information of an exposure time, a shutter speed, and the like) from the imaging unit 103. Furthermore, the CPU 101 receives supply of correction information (e.g., information of white balance correction and the like) from the imaging system correction circuit 104. Moreover, the CPU 101 receives supply of gain information (a gain value) from the gain adjustment circuit 105.

In the embodiment, the CPU 101 controls the high frequency band edge detection circuit 111 such that a pass-band of a filtering unit thereof for extracting an edge detection signal is applicable to a frequency of the extracted edge detection signal on the basis of the lens information (the information of a lens model number, a zoom position, an F number, and the like).

That is, a frequency band of the captured image changes in accordance with a zoom position. In a case in which a zoom lens is mounted to perform imaging with zooming, a frequency band of a captured image mostly drops further in comparison to a case in which imaging is performed at a uniform magnification in general.

Figure 2:
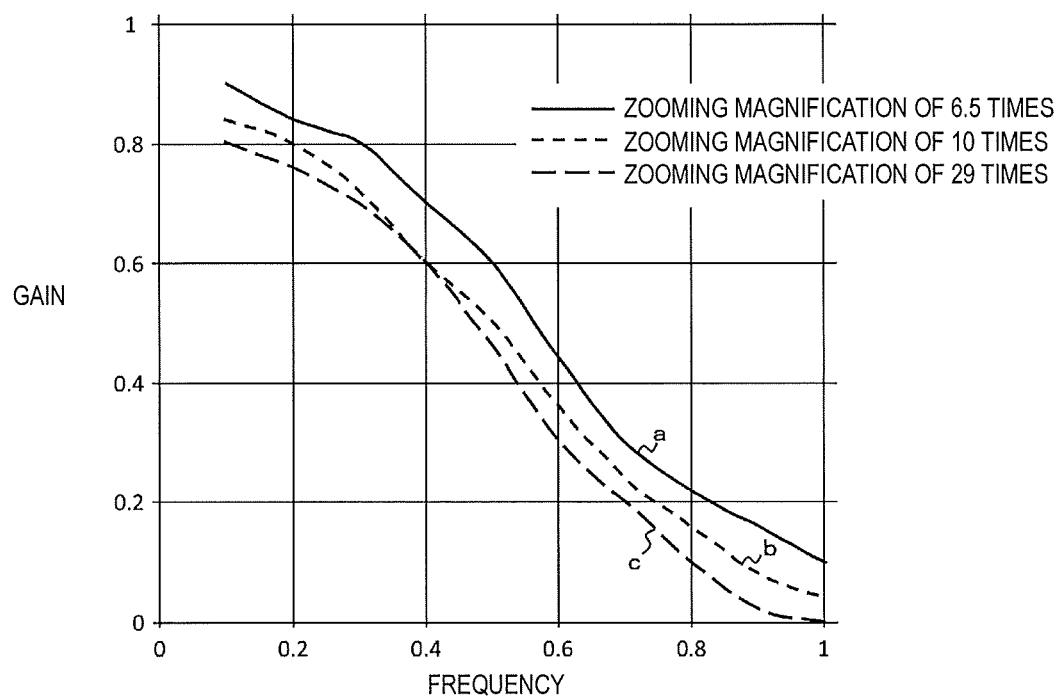
FIG. 2 is a graph showing an example of frequency characteristics of a high-magnification (100 magnifying power) zoom lens.

A case in which, for example, a 4K camera with a high-magnification (a 100-times magnification) zoom lens having lens frequency characteristics as shown in FIG. 2 performs imaging may be considered. The solid line a indicates lens frequency characteristics when a zoom magnification is 6.5 times, the dashed line b indicates lens frequency characteristics when a zoom magnification is 10 times, and the dashed line c indicates lens frequency characteristics when a zoom magnification is 29 times.

In this case, 4K resolution that is substantially close to a highest frequency (around frequency of 1) can be obtained in the case in which imaging is performed at a low magnification (zoom magnification of 6.5 times). However, it is nearly not possible to obtain 4K resolution due to the lens characteristics in the case in which imaging is performed at a high magnification (the zoom magnification of 29 times).

In a case in which a filter is designed such that a signal having a nearly highest frequency is obtained at a uniform magnification, a high frequency region is gradually lost when zooming is gradually performed, and thus it is difficult to obtain high frequency edge information in a filtering process. On the other hand, in a case in which a filter is designed such that a high frequency edge signal is obtained at a 100-times magnification, excess edge signals are output at a uniform magnification and thus it is difficult to determine a degree of focus-matching.

Figure 3:
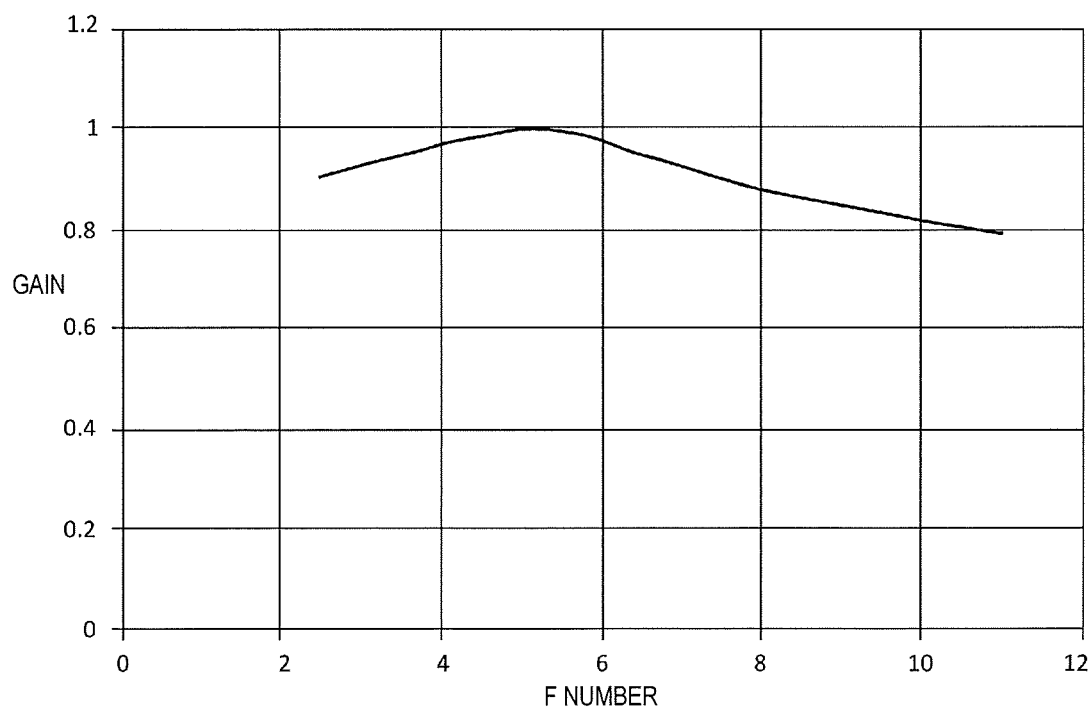
FIG. 3 is a graph showing an example of characteristics of a highest frequency band in accordance with F numbers.

In addition, a frequency band of a captured image changes in accordance with F numbers (aperture values). FIG. 3 shows an example of characteristics of a highest frequency band in accordance with F numbers. In this case, the highest resolution appears around F5, and the greater an F number is (the narrower an iris is), the lower the resolution is due to aperture blurring, but on the contrary, the smaller an F value is (the wider the iris is), the lower the resolution is due to releasing blurring. Note that a frequency response in accordance with F numbers is uniquely determined depending on a lens model number (a type of lens).

In addition, a frequency band of a captured image changes in accordance with lens model numbers (types of lenses).

The lens here has MTF characteristics for its lens model number. The MTF characteristics express spatial frequency characteristics of the lens.

In this embodiment, although details will be provided below, the filtering unit of the high frequency band edge detection circuit 111 is constituted by a first high-pass filter that has a high-band cutoff frequency, a second high-pass filter that has a low-band cutoff frequency, and an α blending unit that α-blends output of the high-pass filters.

As described above, the CPU 101 supplies filter factors e1 and e2 for configuring the first and second high-pass filters and an α value for α-blending to the high frequency band edge detection circuit 111 to control a pass-band of the filtering unit of the high frequency band edge detection circuit 111 for extracting an edge detection signal. In this case, the CPU 101 calculates, for example, the filer factors e1 and e2 on the basis of the lens model number and then calculates the α value on the basis of the zoom position and the F number.

In addition, in this embodiment, the CPU 101 controls a gain of the edge detection signal on the basis of the lens information (the information of the lens model number, the zoom position, the F number, and the like) to make the gain of the edge detection signal extracted by the high frequency band edge detection circuit 111 stabilized.

Figure 4:
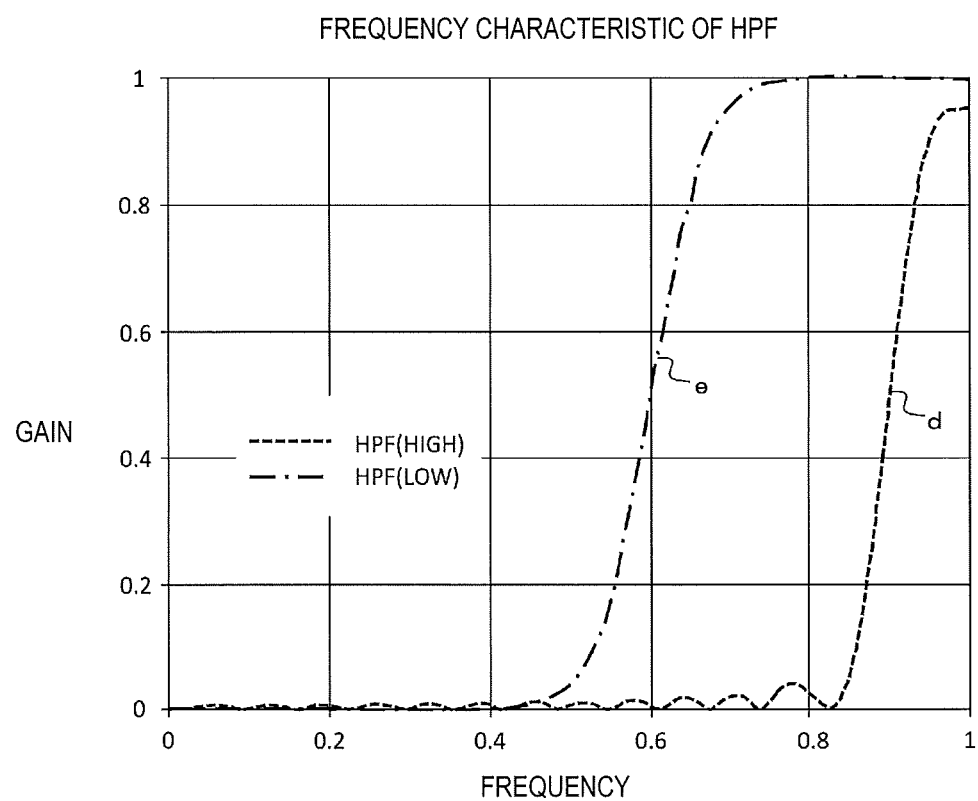
FIG. 4 is a graph showing an example of frequency characteristics of a high-pass filter.
Figure 5:
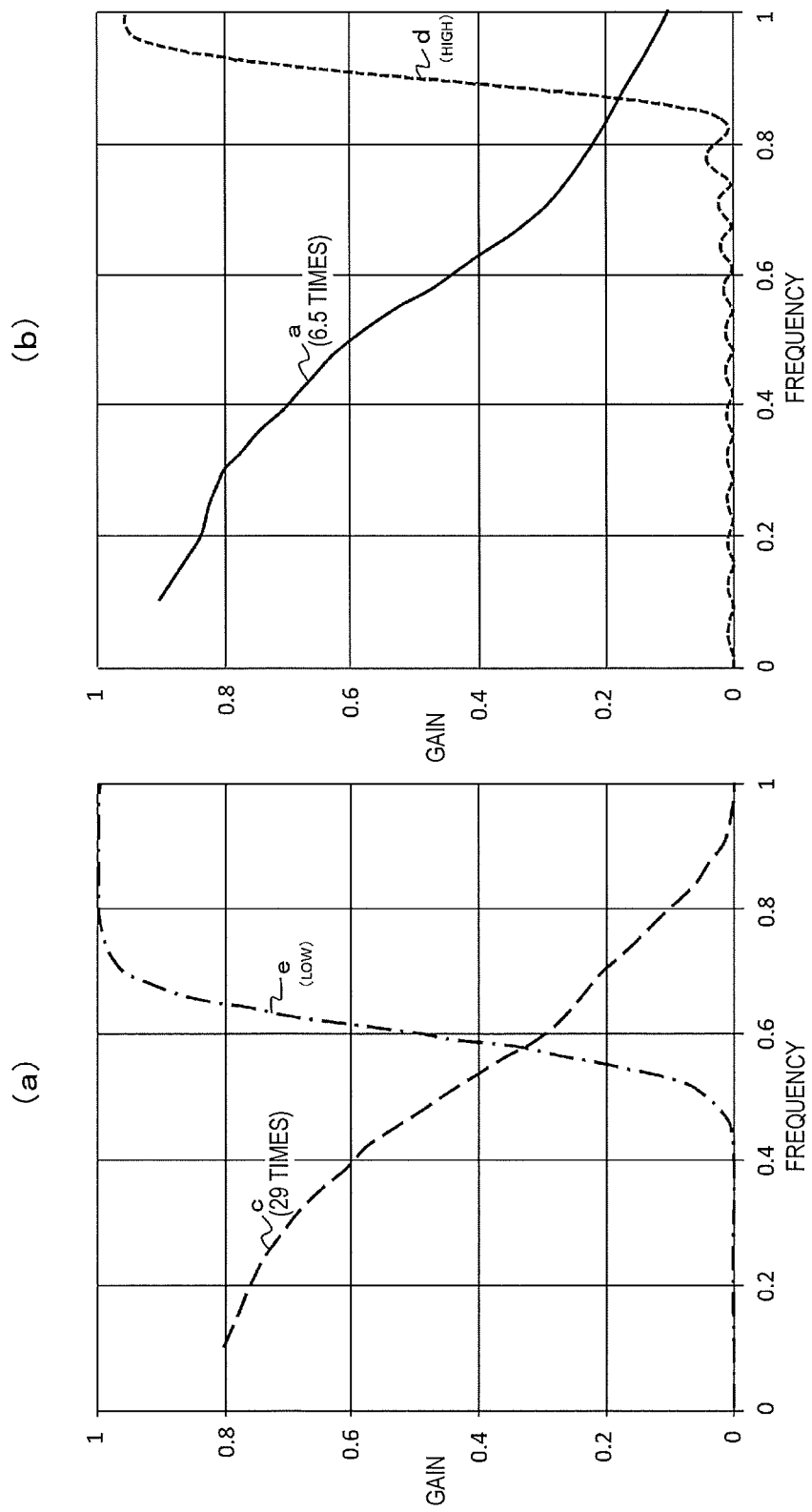
FIG. 5 is a graph for describing fluctuation of gains of an edge detection signal.

For example, the dashed line d of FIG. 4 indicates an example of a frequency characteristic of the first high-pass filter having a high-band cutoff frequency and the dashed-dotted line e of FIG. 4 indicates an example of a frequency characteristic of the second high-pass filter having a low-band cutoff frequency. As is shown in FIG. 5 (a), a maximum gain in a case in which the low-band high-pass filter is applied (α=0) when a zoom magnification is set to 29 times is approximately 0.3. Meanwhile, a maximum gain in a case in which the high-band high-pass filter is applied (α=1) when a zoom magnification is set to 6.5 times is approximately 0.2 as shown in FIG. 5 (b).

The CPU 101 supplies a gain factor g for make the gain of the edge detection signal extracted by the filtering unit of the high frequency band edge detection circuit 111 as described above uniform to the high frequency band edge detection circuit 111. For example, in the above-described example, the gain of the edge detection signal extracted by the filtering unit when the zoom magnification is set to 6.5 times is 1.5 times the gain when the zoom magnification is set to 29 times. In this case, for example, the CPU 101 calculates the gain factor g from the above-described α value.

In addition, as will be described in detail in the embodiment, the high frequency band edge detection circuit 111 includes a coring unit for reducing noise included in the edge detection signal extracted by the filtering unit.

Coring is suppressing an input signal with amplitude that is smaller than a certain value, regarding it as a noise component. It is known that an amount of random noise depends on a signal level (as signal amplitude becomes greater, noise increases accordingly). For this reason, a coring level is generally changed in accordance with average luminance of nearby input pixels.

In the embodiment, the CPU 101 modulates a coring level on the basis of the imaging information, the correction information, the gain information, and the like. In a case in which a gain-up process is performed, for example, amplitude of random noise increases accordingly, and on the contrary, in a case in which a gain-down process is performed, amplitude of random noise decreases accordingly. Thus, the coring level is modulated in accordance with gains.

In the embodiment, the CPU 101 obtains a modulation factor m for modulating the coring level on the basis of the imaging information, the correction information, the gain information, and the like to modulate the coring level and supplies the modulation factor to the high frequency band edge detection circuit 111.

An operation of the imaging device 10 illustrated in FIG. 1 will be briefly described. Light from a subject that has passed through the lens unit 102 is received by the imaging sensor (image sensor) of the imaging unit 103. Then, the imaging unit 103 performs photo-electric conversion and A/D conversion and thereby obtains a captured image signal with 4K resolution. This captured image signal is appropriately processed by the imaging system correction circuit 104 and the gain adjustment circuit 105 and then supplied to the knee/gamma correction circuit 106.

The knee/gamma correction circuit 106 performs knee correction for causing an output signal to comply with a signal standard and gamma correction for correcting monitor gamma on the captured image signal. The corrected captured image signal is supplied to the output signal generation circuit 107. The output signal generation circuit 107 converts the captured image signal to have a final output format and outputs the image signal to the outside as main line output for 4K images.

In addition, the captured image signal corrected by the knee/gamma correction circuit 106 is supplied to the down-converting circuit 108. The down-converting circuit 108 performs a down-conversion process (a resolution conversion process) on the captured image signal and thereby generates an image signal with HD resolution. This image signal with HD resolution is supplied to the output signal generation circuit 109. The output signal generation circuit 109 converts the image signal with HD resolution to have an output format suitable for the viewfinder (display device) on the output side and outputs the image signal to the outside as viewfinder output for HD images.

An angle of view and focus of the main line output image is changed by a user through an operation of the lens unit 102 at any time. Since the viewfinder output corresponds to the main line output, the user can check a change in an angle of view and focus of the main line output image through the viewfinder output in real time.

In addition, the image signal with HD resolution obtained by the down-converting circuit 108 is supplied to the edge detection circuit 110. The edge detection circuit 110 performs, for example, a high-pass filtering process on the image signal with HD resolution for each of pixels, and thereby obtains an edge detection signal EG_1 with HD resolution. This edge detection signal EG_1 with HD resolution is supplied to the output signal generation circuit 109 as a low-frequency band edge detection signal.

In addition, the captured image signal with 4K resolution whose gain has been adjusted by the gain adjustment circuit 104 is supplied to the high frequency band edge detection circuit 111. The high frequency band edge detection circuit 111 extracts an edge detection signal of a high frequency band from the captured image signal with 4K resolution, performs a down-conversion process on the edge detection signal, and thereby obtains an edge detection signal EG_2 with HD resolution.

In this case, the CPU 101 controls the high frequency band edge detection circuit 111 such that a pass-band of the filtering unit for extracting an edge detection signal is applicable to a frequency of the edge detection signal to be extracted on the basis of the lens information (the information of the lens model number, the zoom position, the F number, and the like). To this end, the CPU 101 supplies the filter factors e1 and e2 for configuring the first and second high-pass filters and the α value for α blending to the high frequency band edge detection circuit 111.

Further, in this case, the CPU 101 controls a gain of the edge detection signal on the basis of the lens information (the information of the lens model number, the zoom position, the F number, and the like) to make the gain of the edge detection signal extracted by the high frequency band edge detection circuit 111 stabilized. To this end, the CPU 101 supplies the gain factor g to the high frequency band edge detection circuit 111.

Moreover, in this case, the high frequency band edge detection circuit 111 performs coring to suppress a noise component of the extracted edge detection signal. The CPU 101 modulates a coring level on the basis of the imaging information, the correction information, the gain information, and the like. To this end, the CPU 101 supplies the modulation factor m to the high frequency band edge detection circuit 111.

The output signal generation circuit 109 combines the image signal with HD resolution that would be the above-described viewfinder output with the edge detection signal EG_1 of the low frequency band obtained by the edge detection circuit 110 and the edge detection signal EG_2 of the high frequency band obtained by the high frequency band edge detection circuit 111. In this case, edge information displays (e.g., edge-emphasized displays) resulting from the combined edge detection signals EG_1 and EG_2 of both frequency bands are combined so as to be distinguished by a difference, for example, a hue, luminance, or a type of line (a solid line, a dashed line, or the like). Note that, in a case in which the edge information displays of both frequency bands are distinguished by hues, it is desirable for the edge information displays to be adjusted by the user so as to have easily-viewable colors or brightness in accordance with color of the subject.

Figure 6:
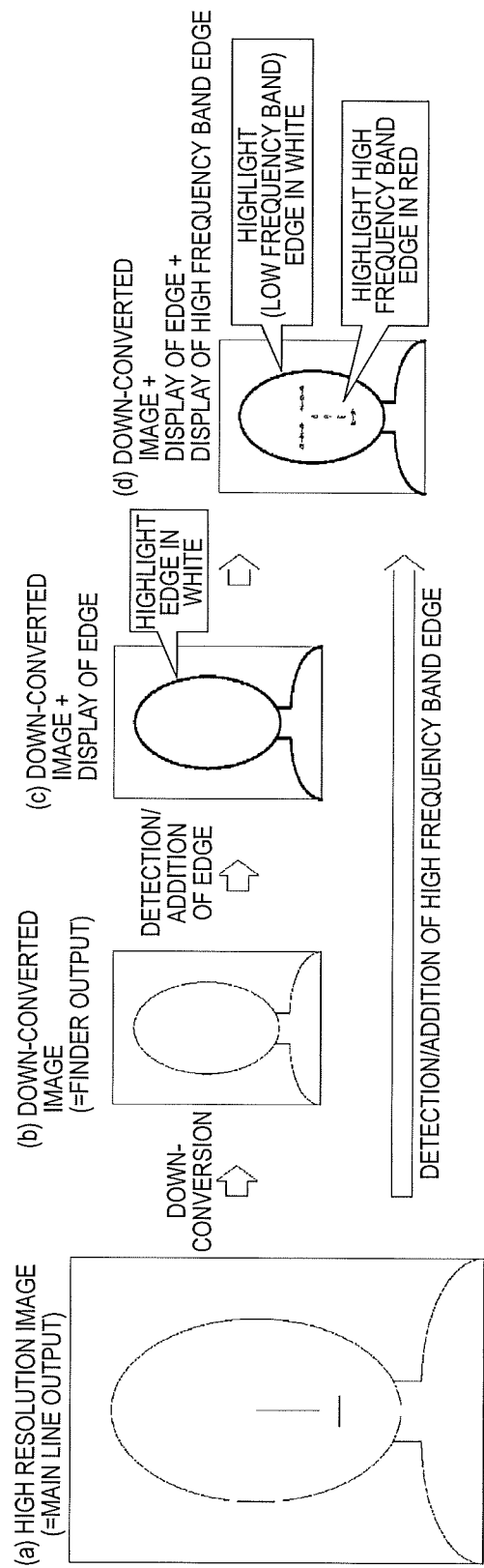
FIG. 6 is a diagram illustrating an example of an edge information display of a viewfinder image (a down-converted image) of the imaging device.

FIG. 6 illustrates an example of an edge information display (e.g., an edge-emphasized display) of the viewfinder image (a down-converted image) of the imaging device 10 illustrated in FIG. 1. FIG. 6 (a) illustrates an example of an image of the image signal with 4K resolution that would be the main line output. FIG. 6 (b) illustrates an example of an image formed with the image signal with HD resolution obtained by performing the down-conversion process on the image signal with 4K resolution. FIG. 6 (c) illustrates an example of an image obtained by adding only the edge detection signal EG_1 with HD resolution detected on the basis of the image signal with HD resolution to the image signal with HD resolution. In this case, for example, low frequency band edges are highlighted in white.

FIG. 6 (d) illustrates an example of an image obtained by adding the edge detection signal EG_1 with HD resolution and the edge detection signal EG_2 with HD resolution, which has been obtained by performing the filtering process on the captured image signal with 4K resolution and further the down-conversion process thereon, to the image signal with HD resolution. In this case, for example, low frequency band edges are highlighted in white and high frequency band edges are highlighted in red.

When focus is to be adjusted on the basis of the viewfinder display, for example, first, focus is roughly adjusted viewing the low frequency band edges colored in white and then focus is finely adjusted, for example, with reference to the high frequency band edges colored in red. Accordingly, it is easy to accurately adjust focus for an image with 4K resolution only with the viewfinder display of HD resolution.

[Example of Configuration of High Frequency Band Edge Detection Circuit]

Figure 7:
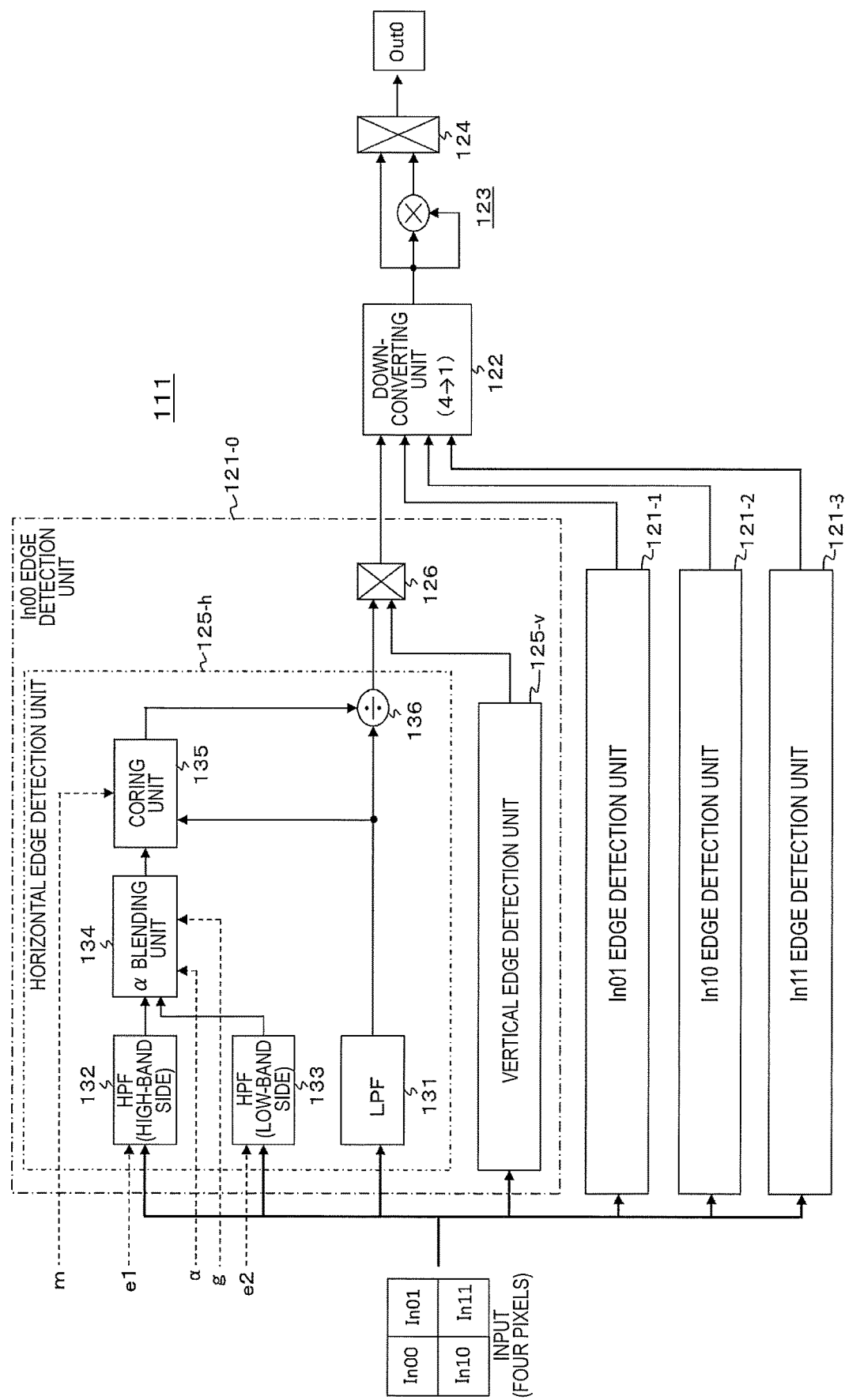
FIG. 7 is a block diagram illustrating an example of a configuration of a high frequency band edge detection circuit.

FIG. 7 illustrates an example of a configuration of the high frequency band edge detection circuit 111. The high frequency band edge detection circuit 111 processes the captured image in units of 2×2=4 pixels. Here, the 4 pixels are assumed to be a pixel In00, a pixel In01, a pixel In10, and a pixel In11. The high frequency band edge detection circuit 111 has an In00 edge detection unit 121-0, an In01 edge detection unit 121-1, an In10 edge detection unit 121-2, an In11 edge detection unit 121-3, a down-converting unit 122, a squaring unit 123, and a selector 124.

The In00 edge detection unit 121-0 obtains an edge detection signal corresponding to the pixel In00 on the basis of signals of nearby pixels. The In01 edge detection unit 121-1 obtains an edge detection signal corresponding to the pixel In01 on the basis of signals of nearby pixels. The In10 edge detection unit 121-2 obtains an edge detection signal corresponding to the pixel In10 on the basis of signals of nearby pixels. The In11 edge detection unit 121-3 obtains an edge detection signal corresponding to the pixel In11 on the basis of signals of nearby pixels.

The In00 edge detection unit 121-0 has a horizontal edge detection unit 125-$h$, a vertical edge detection unit 125-$v$, and a selector 126. The horizontal edge detection unit 125-$h$ obtains a horizontal edge detection signal corresponding to the pixel In00 on the basis of signals of nearby pixels. The horizontal edge detection unit 125-$h$ has a low-pass filter 131, a high-pass filter (a first high-pass filter) 132, another high-pass filter (a second high-pass filter) 133, an α blending unit 134, a coring unit 135, and a divider 136.

The high-pass filter 132 has the filter factor e1 supplied from the CPU 101, has a high-band cutoff frequency (see the frequency characteristic indicated by the dashed line d of FIG. 4), and detects a horizontal signal (an edge detection signal) of a high frequency band of the pixel In00. The high-pass filter 133 has the filter factor e2 supplied from the CPU 101, has a low-band cutoff frequency (see the frequency characteristic indicated by the dashed line e of FIG. 4), and detects a horizontal signal (an edge detection signal) of a high frequency band of the pixel In00. The α blending unit 134 performs α blending on output of the high-pass filters 132 and 133 using the α value and the gain factor g supplied from the CPU 101, further performs gain adjustment thereon, and thereby obtains an edge detection signal Edge.

The process of the α blending unit 134 can be expressed with the following formula (1). Here, "HPF-H" represents output of the high-pass filter 132 and "HPF-L" represents output of the high-pass filter 133. The output of the high-pass filter 132 becomes more dominant as the α value increases, and on the contrary, the output of the high-pass filter 133 becomes more dominant as the α value decreases.

$$\text{Edge}=\{HPF\text{-}H\times\alpha+HPF\text{-}L\times(1-\alpha)\}\times g \tag{1}$$

The high-pass filters 132 and 133 and the α blending unit 134 constitute the filtering unit for extracting an edge detection signal. The pass-band of the filtering unit is controlled to deal with an edge detection signal of a desired frequency band at all times with the filter factors e1 and e2 and the α value supplied from the CPU 101. For example, α=0 when a maximum zoom-in is set, α=1 when no zooming is used, and α=0.5 when a zoom position is at the center.

By flexibly changing the α value in accordance with zoom positions in that manner, optimum output of the high-pass filters can be created no matter where the zoom position is, and thus an edge detection signal of a desired frequency band can be obtained at all times. In addition, since the CPU 101 supplies the gain factor g, a gain of the edge detection signal extracted by the filtering unit can be controlled so as to be stable.

The low-pass filter 131 obtains an average value of horizontal signal levels of the nearby pixels of the pixel In00 when the filtering unit detects the horizontal signal (an edge detection signal) of a high frequency band of the pixel In00.

The coring unit 135 receives input of the signal (edge detection signal) of the high frequency band detected by the filtering unit and outputs the signal with suppressed noise. Since the filtering unit responses not only to edges but also to high frequency random noise, the signal (edge detection signal) of the high frequency band detected by the filtering unit also includes the high frequency random noise. The coring unit 135 suppresses an input signal with amplitude that is smaller than a certain value, regarding it as a noise component.

Specifically, if a level of the input signal is set to X and a coring level is set to CORE-LEVEL×m, a level of an output signal Y is obtained by using the following formula (2). Here, "CORE-LEVEL" is an average value of the signal levels of the nearby pixels obtained by the low-pass filter 131 and "m" is a modulation factor supplied from the CPU 101. By modulating "CORE-LEVEL" with the modulation factor m in that manner, noise components can be effectively reduced.

[Math. 1]

$$Y = \begin{cases} X - \text{CORE\_LEVEL} * m, & \text{if } (X \geq \text{CORE\_LEVEL} * m) \\ 0, & \text{if } (-\text{CORE\_LEVEL} * m < X < \text{CORE\_LEVEL} * m) \\ X + \text{CORE\_LEVEL} * m, & \text{otherwise} \end{cases} \quad (2)$$

The divider 136 divides the signal (edge detection signal) of the high frequency band whose noise has been processed to be suppressed by the coring unit 135 by the average value of the signal levels of the nearby pixels obtained by the low-pass filter 131 and normalizes the result.

In a case in which a natural image is imaged, in general, an amount of spatial change increases as a signal level is higher and brighter, and the amount of spatial change decreases as the signal level is lower and darker. Thus, output of the filtering unit (output of the α blending unit 134) easily has a high value in a bright region and a lower value in a dark region. In other words, edges are easily erroneously detected in bright regions and edges are difficult to detect in dark regions.

The divider 136 performs the normalization process to solve that problem. In this case, the value of the output of the filtering unit is normalized to be a low value in a bright region in which output of the low-pass filter 131 has a high value, and the value of the output of the filtering unit is normalized to be a high value in a dark region in which output of the low-pass filter 131 has a low value. Thus, since the divider 136 performs the normalization process, erroneous detection of edges is suppressed in the bright region and edges are easily detected in the dark region.

Although detailed description is omitted, the vertical edge detection unit 125-v has a similar configuration to the above-described horizontal edge detection unit 125-h, and detects a vertical signal (an edge detection signal) of a frequency band. The selector 126 selectively takes a signal having a greater absolute value between the horizontal edge detection signal of the pixel In00 detected by the horizontal edge detection unit 125-h and the vertical edge detection signal of the pixel In00 detected by the vertical edge detection unit 125-v, and outputs the signal as an edge detection signal of the In00 edge detection unit 121-0, i.e., an edge detection signal corresponding to the pixel In00.

Although detailed description is omitted, the In01 edge detection unit 121-1, the In10 edge detection unit 121-2, and the In11 edge detection unit 121-3 have a similar configuration to the above-described In00 edge detection unit 121-0 and respectively output high frequency band signals (edge detection signals) corresponding to the pixel In01, the image In10, and the pixel In11.

The down-converting unit 122 performs a down-conversion process on the edge detection signals detected by the edge detection units 121-0, 121-1, 121-2, and 121-3 and thereby obtains an edge detection signal with HD resolution. The down-converting unit 122 performs the down-conversion process from 4K resolution to HD resolution at a ratio of 2:1 in two horizontal and vertical directions.

In general, the down-conversion process is a process of thinning out pixels by an amount "the number of input pixels—the number of output pixels" using any method. For example, down-conversion at the ratio of 2:1 can be realized simply by thinning out every other pixel. However, edge information present in a thinning-out phase is lost during such simple thinning. Furthermore, generally in such a down-conversion process, band-limiting using a low-pass filter (LPF) is applied to suppress folding distortion (aliasing) and then thinning is performed. If thinning is performed after the application of band-limiting, however, edge information in a high frequency band is lost due to the low-band-limiting process.

For that reason, the down-converting unit 122 realizes the down-conversion process from the 4K resolution to the HD resolution at the ratio of 2:1 in the two horizontal and vertical directions while high frequency band edges are maintained by having a difference between continuous edge signals and devising to output a set of signals whose difference is the maximum.

The squaring unit 123 makes the edge detection signal with HD resolution generated by the down-converting unit 122 squared using a multiplier and outputs the result. The gain obtained by the filtering unit can have a form of a quadratic function through the squaring process and thus the signal of a narrower band range can be highlighted.

The selector 124 selectively outputs the linear edge detection signal from the down-converting unit 122 or the squared edge detection signal from the squaring unit 123, for example, on the basis of a selection operation by a cameraman (a user). Whether selecting the squared edge detection signal and narrowing a range of a focus position in which high frequency band edges are displayed or selecting the linear edge detection signal and widening the range of the focus position in which high frequency band edges are displayed makes focusing easier depends on preference of the cameraman.

An operation of the high frequency band edge detection circuit 111 illustrated in FIG. 7 will be briefly described. The horizontal edge detection unit 125-*h* obtains a horizontal edge detection signal (a high frequency band signal) of the pixel In00 on the basis of nearby pixels for every 4-pixel set. Likewise, the vertical edge detection unit 125-*v* obtains a vertical edge detection signal (a high frequency band signal) of the pixel In00 on the basis of the nearby pixels for every 4-pixel set.

The horizontal edge detection signal of the pixel In00 obtained by the horizontal edge detection unit 125-*h* is supplied to the selector 126. In addition, the vertical edge detection signal of the pixel In00 obtained by the vertical edge detection unit 125-*v* is supplied to the selector 126. The selector 126 selectively takes a signal having a greater absolute value between the two edge detection signals and outputs the signal as an edge detection signal of the In00 edge detection unit 121-0. i.e., an edge detection signal corresponding to the pixel In00.

In addition, the In01 edge detection unit 121-1, the In10 edge detection unit 121-2, and the In11 edge detection unit 121-3 respectively output edge detection signals (high frequency band signals) corresponding to the pixel In01, the image In10, and the pixel In11. Each of the edge detection signals is supplied to the down-converting unit 122. The down-converting unit 122 performs the down-conversion process on the edge detection signals and thereby obtains an edge detection signal with HD resolution.

The edge detection signal with HD resolution obtained by the down-converting unit 122 is supplied to the squaring unit 123. The squaring unit 123 makes the edge detection signal with HD resolution squared using the multiplier. The squared edge detection signal obtained by the squaring unit 123 and the linear edge detection signal obtained by the down-converting unit 122 are supplied to the selector 124.

The selector 124 selectively outputs the linear edge detection signal or the squared edge detection signal, for example, on the basis of a selection operation by a cameraman (a user). This output is output of the high frequency band edge detection circuit 111. The high frequency band edge detection circuit 111 obtains an edge detection signal at a ratio of one output pixel "Out0" to four input pixels "In00, In01, In10, and In11." That is, the edge detection signal EG_2 with HD resolution is obtained from the captured image signal with 4K resolution.

As described above, the imaging device 10 illustrated in FIG. 1 controls the high frequency band for extracting the edge detection signals from the captured image signal with 4K resolution, i.e., the pass-band of the filtering unit constituted by the high-pass filters 132 and 133 and the α blending unit 134 included in the high frequency band edge detection circuit 111 on the basis of the lens information. Thus, even if frequencies of the edge detection signals included in the captured image signal vary due to a change in a zoom position, a lens model number, an F number, and the like, the edge detection signals can be satisfactorily detected at all times.

In addition, the imaging device 10 illustrated in FIG. 1 controls the gain of the edge detection signals extracted by the filtering unit constituted by the high-pass filters 132 and 133 and the α blending unit 134 included in the high frequency band edge detection circuit 111 on the basis of the lens information. Thus, even if the gain of the edge detection signals extracted by the filtering unit varies due to a change in the zoom position, the lens model number, the F number, and the like, the gain of the edge detection signals can be stabilized.

Furthermore, the imaging device 10 illustrated in FIG. 1 controls (modulates) a coring level on the basis of imaging information, correction information, and gain information when the coring unit 135 reduces noise included in the edge detection signals extracted by the filtering unit constituted by the high-pass filters 132 and 133 and the α blending unit 134 included in the high frequency band edge detection circuit 111. Thus, noise components included in the edge detection signals extracted by the filtering unit can be effectively reduced.

2. Second Embodiment

[Example of Configuration of Imaging Device]

Figure 8:
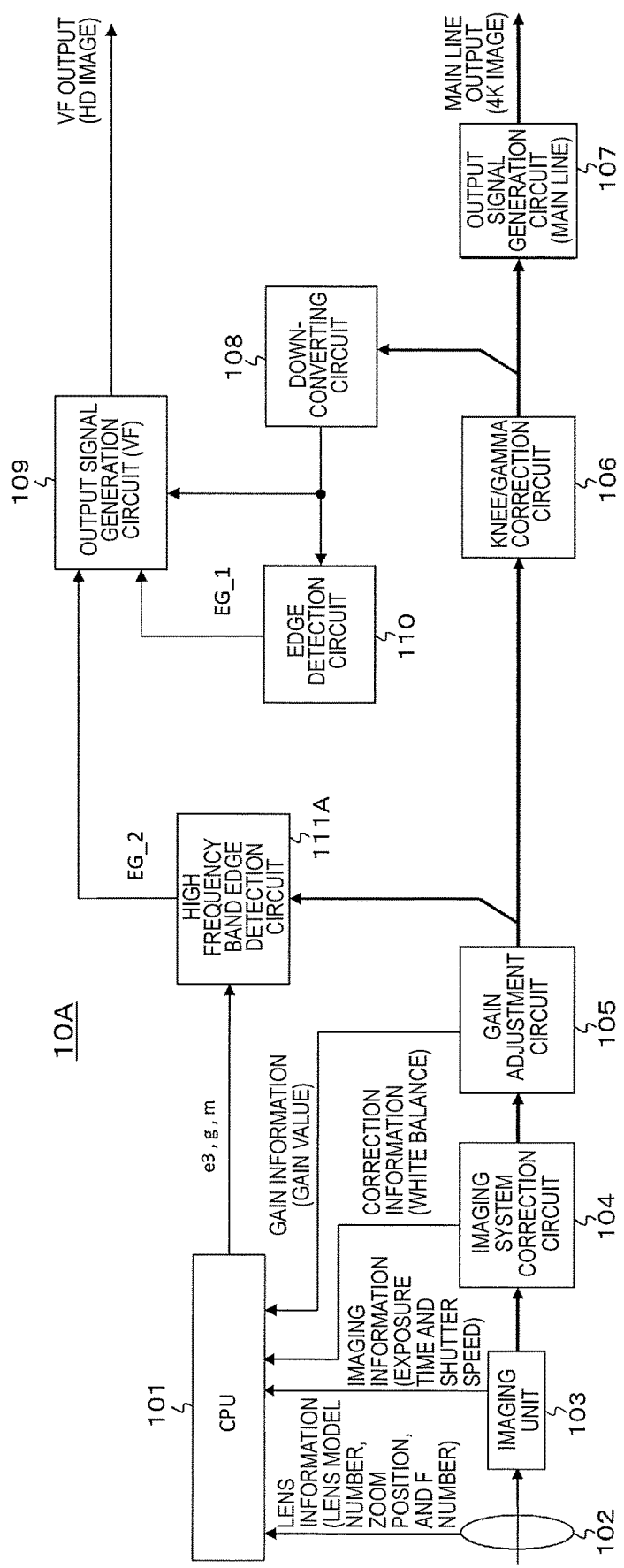
FIG. 8 is a block diagram illustrating an example of a configuration of an imaging device (a camera system) as a second embodiment.

FIG. 8 illustrates an example of a configuration of an imaging device (a camera system) 10A as a second embodiment. In FIG. 8, the same reference numerals are given to constituent elements corresponding to those of FIG. 1 and detailed description thereof is appropriately omitted.

The imaging device 10A has the same configuration as the imaging device 10 illustrated in FIG. 1 except that the high frequency band edge detection circuit 111 is replaced with the high frequency band edge detection circuit 111A. The high frequency band edge detection circuit 111 includes the filtering unit constituted by the high-pass filters 132 and 133 and the α blending unit 134 to extract edge detection signals (a high frequency band signal) as described above (see FIG. 7).

Figure 9:
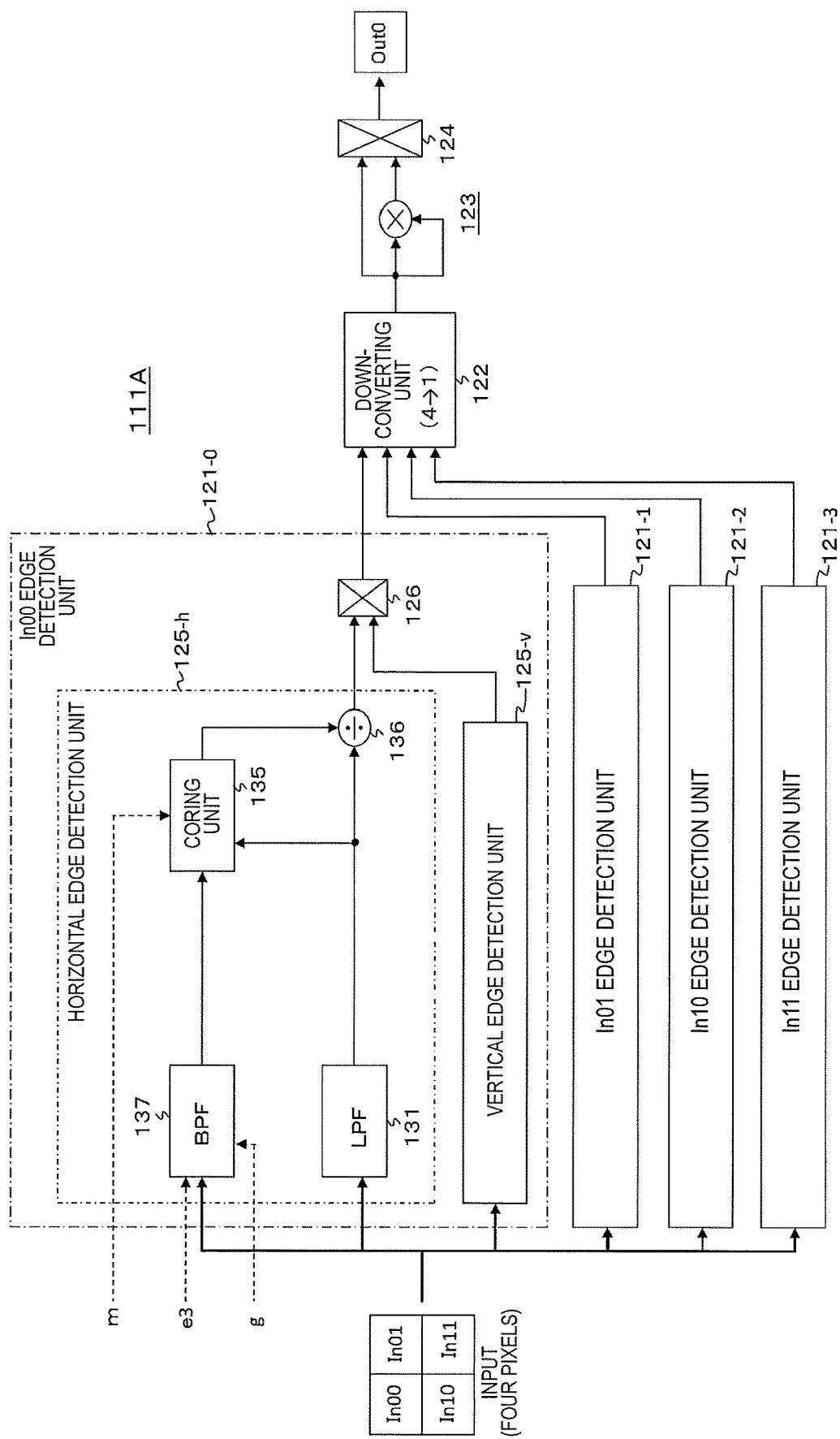
FIG. 9 is a block diagram illustrating an example of a configuration of a high frequency band edge detection circuit.

The high frequency band edge detection circuit 111A of the imaging device 10A includes a filtering unit constituted by a band-pass filter 137 as illustrated in FIG. 9. Constituent elements of FIG. 9 corresponding to those of FIG. 7 are indicated by the same reference numerals.

The CPU 101 controls the high frequency band edge detection circuit 111A such that a pass-band of the filtering unit for extracting edge detection signals can be applicable to edge detection signals of a desired frequency band at all times on the basis of lens information (information including a lens model number, a zoom position, an F number, and the like). To this end, the CPU 101 calculates a filter factor e3 of the band-pass filter 137 on the basis of the lens information and supplies the filter factor e3 to the band-pass filter 137.

Note that the band-pass filter 137 also performs a process for stabilizing a gain of an extracted edge detection signal (a high frequency band signal). To this end, the CPU 101 calculates a gain factor g on the basis of the lens information and supplies the gain factor g to the band-pass filter 137.

As described above, the imaging device 10A illustrated in FIG. 8 controls the pass-band of the filtering unit for extracting edge detection signals from a captured image signal with 4K resolution on the basis of the lens information, like the imaging device 10 illustrated in FIG. 1, and therefore the same effect as that of the imaging device 10 illustrated in FIG. 1 can be obtained.

3. Third Embodiment

[Example of Configuration of Imaging Device]

Figure 10:
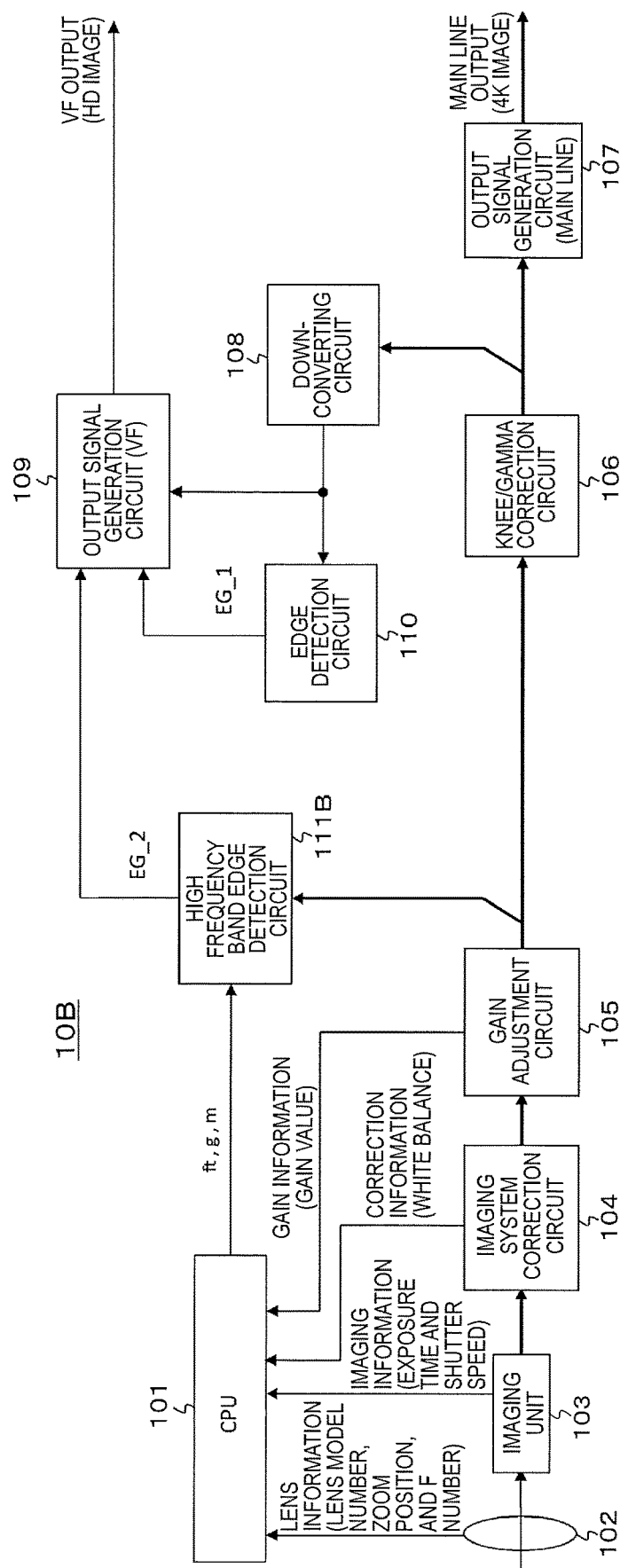
FIG. 10 is a block diagram illustrating an example of a configuration of an imaging device (a camera system) as a third embodiment.

FIG. 10 illustrates an example of a configuration of an imaging device (a camera system) 10B as a third embodiment. In FIG. 10, the same reference numerals are given to constituent elements corresponding to those of FIG. 1 and detailed description thereof is appropriately omitted.

The imaging device 10B has the same configuration as the imaging device 10 illustrated in FIG. 1 except that the high frequency band edge detection circuit 111 is replaced with the high frequency band edge detection circuit 111B. The high frequency band edge detection circuit 111 includes the filtering unit constituted by the high-pass filters 132 and 133 and the α blending unit 134 to extract edge detection signals (high frequency band signals) as described above (see FIG. 7).

Figure 11:
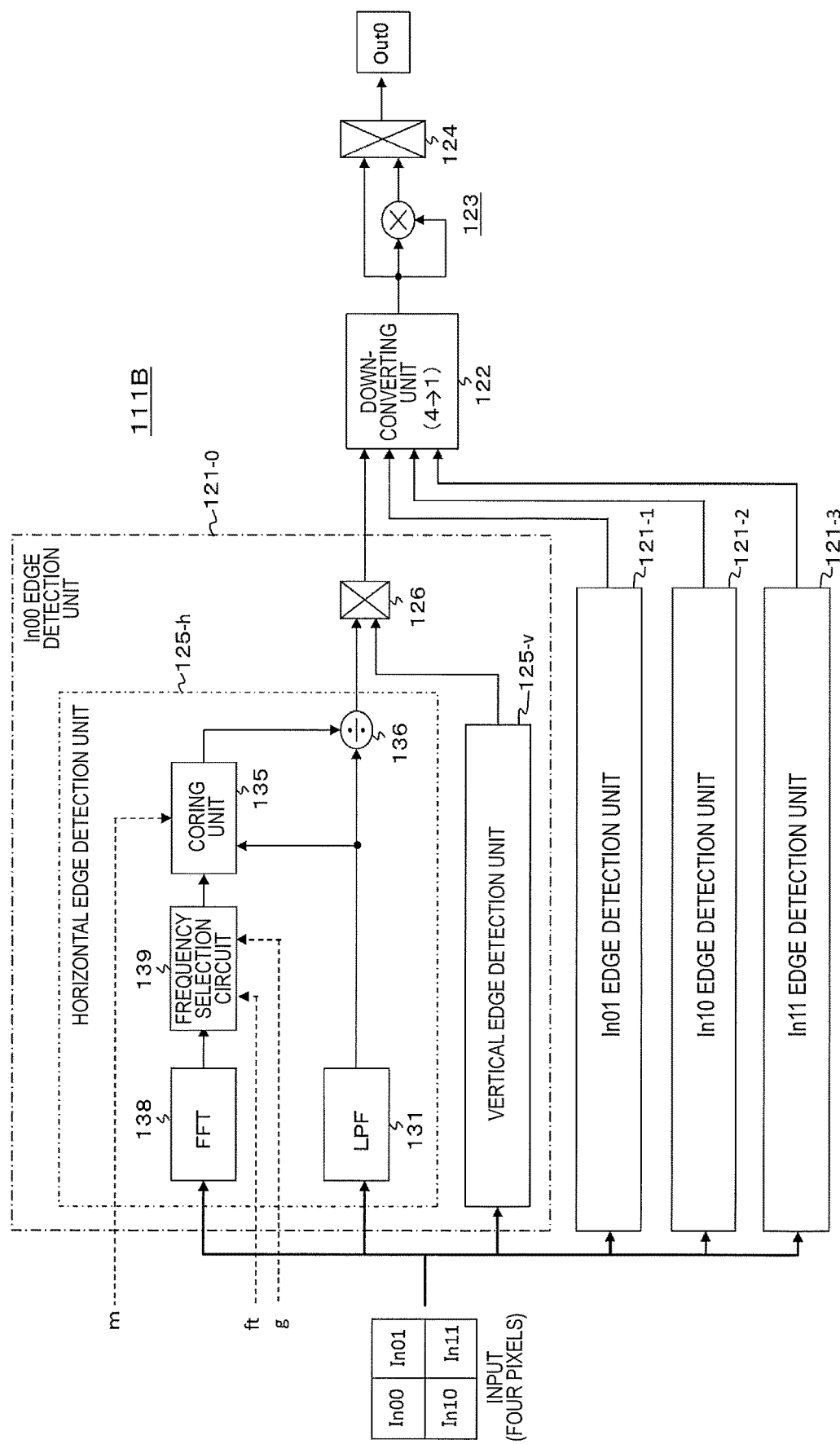
FIG. 11 is a block diagram illustrating an example of a configuration of a high frequency band edge detection circuit.

The high frequency band edge detection circuit 111B of the imaging device 10B includes a filtering unit constituted by a fast Fourier transform (FFT) circuit 138 and a frequency selection circuit 139 as illustrated in FIG. 11. Constituent elements of FIG. 11 corresponding to those of FIG. 7 are indicated by the same reference numerals.

The fast Fourier transform (FFT) circuit 138 analyzes frequencies of a captured image signal with 4K resolution. The frequency selection circuit 139 selectively extracts a frequency component of an edge detection signal (a high frequency band signal) from frequency components obtained through the frequency analysis by the fast Fourier transform (FFT) circuit 138 and takes the edge detection signal.

The CPU 101 controls the high frequency band edge detection circuit 111A such that a pass-band of the filtering unit for extracting edge detection signals can be applicable to edge detection signals of a desired frequency band at all times on the basis of lens information (information including a lens model number, a zoom position, an F number, and the like). To this end, the CPU 101 calculates a target frequency ft that is a frequency to be extracted by the frequency selection circuit 139 on the basis of the lens information and supplies the target frequency ft to the frequency selection circuit 139.

Note that the frequency selection circuit 139 also performs a process for stabilizing a gain of an extracted edge detection signal (a high frequency band signal). To this end, the CPU 101 calculates a gain factor g on the basis of the lens information and supplies the gain factor g to the frequency selection circuit 139.

As described above, the imaging device 10B illustrated in FIG. 10 controls the pass-band of the filtering unit for extracting edge detection signals from a captured image signal with 4K resolution on the basis of the lens information, like the imaging device 10 illustrated in FIG. 1, and therefore the same effect as that of the imaging device 10 illustrated in FIG. 1 can be obtained.

4. Modified Example

Note that the example in which imaging resolution is 4K resolution and display resolution of a viewfinder is HD resolution has been introduced in the above-described embodiments. Thus, the down-converting unit 122 of the high frequency band edge detection circuit 111 performs down-converting at the ratio of 2:1 in two horizontal and vertical directions. In a case in which a ratio of imaging resolution and display resolution of a viewfinder is N:1, for example, the high frequency band edge detection circuit 111 performs down-converting a the ratio of N:1.

In addition, the example in which the viewfinder with HD resolution performs edge information display with HD resolution and edge information display of two frequency band stages of edge information display of 4K resolution at the same time has been introduced in the above-described embodiments. However, performing edge information display of three or more frequency band stages at the same time is also considered. In a case in which imaging resolution is 8K resolution and display resolution of a viewfinder is HD resolution, for example, edge information display with HD resolution, edge information display with 4K resolution, and further edge information display of three frequency band stages of edge information display with 8K resolution can be performed at the same time in a configuration similar to those of the above-described embodiments.

Additionally, the present technology may also be configured as below.

(1)

An image signal processing device including:

a filtering unit configured to extract an edge detection signal of a high frequency band from an image signal obtained from imaging; and a band control unit configured to control the high frequency band on the basis of lens information.

(2)

The image signal processing device according to (1), in which the filtering unit includes a first high-pass filter with a first cutoff frequency, a second high-pass filter with a second cutoff frequency that is lower than the first cutoff frequency, and an α blending unit that performs α blending on output of the first high-pass filter and output of the second high-pass filter.

(3)

The image signal processing device according to (2), in which the band control unit controls at least an α value of the α blending on the basis of the lens information.

(4)

The image signal processing device according to any of (1) to (3), in which the lens information includes at least zoom position information.

(5)

The image signal processing device according to any of (1) to (4), further including:

a gain control unit configured to control a gain of the edge detection signal extracted by the filtering unit on the basis of the lens information.

(6)

The image signal processing device according to any of (1) to (5), further including:

a coring unit configured to reduce noise included in the edge detection signal extracted by the filtering unit; and a coring level control unit configured to control a coring level of the coring unit on the basis of imaging information, correction information, and gain information.

(7)

An image signal processing method including:

a step of extracting an edge detection signal of a high frequency band from an image signal obtained from imaging; and a step of controlling the high frequency band on the basis of lens information.

(8)

An image signal processing device including:

a down-converting unit configured to perform a down-conversion process on an image signal with a first resolution obtained from imaging and generate an image signal with a second resolution that is lower than the first resolution;

a filtering unit configured to extract an edge detection signal of a high frequency band from the image signal with the first resolution;

a band control unit configured to control the high frequency band on the basis of lens information;

a high frequency band edge detection unit configured to perform a down-conversion process on an edge detection signal extracted by the filtering unit and obtain an edge detection signal with the second resolution; and a combining unit configured to combine the edge detection signal obtained by the high frequency band edge detection unit with the image signal with the second resolution generated by the down-converting unit and obtain an image signal with the second resolution for display.

(9)

The image signal processing device according to (8), in which the filtering unit includes a first high-pass filter with a first cutoff frequency, a second high-pass filter with a second cutoff frequency that is lower than the first cutoff frequency, and an α blending unit that performs α blending on output of the first high-pass filter and output of the second high-pass filter.

(10)

The image signal processing device according to (9), in which the band control unit controls at least an α value of the α blending on the basis of the lens information.

The image signal processing device according to any of (8) to (10), in which the lens information includes at least zoom position information.

(12)

The image signal processing device according to any of (8) to (11), in which the first resolution is 4K resolution and the second resolution is HD resolution.

(13)

An image signal processing method including:

a step of performing a down-conversion process on an image signal with a first resolution obtained from imaging and generating an image signal with a second resolution that is lower than the first resolution;

a step of extracting an edge detection signal of a high frequency band from the image signal with the first resolution;

a step of controlling the high frequency band on the basis of lens information;

a step of performing a down-conversion process on the extracted edge detection signal and obtaining an edge detection signal with the second resolution; and a step of combining the obtained edge detection signal with the generated image signal with the second resolution and obtaining an image signal with the second resolution for display.

(14)

An imaging device including:

an imaging unit configured to obtain an imaging signal with a first resolution; and an image signal processing unit configured to process the image signal with the first resolution obtained by the imaging unit and obtain an image signal with a second resolution for viewfinder display, which is lower than the first resolution, in which the image signal processing unit includes a down-converting unit configured to perform a down-conversion process on an image signal with the first resolution and generate an image signal with the second resolution that is lower than the first resolution, a filtering unit configured to extract an edge detection signal of a high frequency band from the image signal with the first resolution, a band control unit configured to control the high frequency band on the basis of lens information, a high frequency band edge detection unit configured to perform a down-conversion process on an edge detection signal extracted by the filtering unit and obtain an edge detection signal with the second resolution, and a combining unit configured to combine the edge detection signal obtained by the high frequency band edge detection unit with the image signal with the second resolution generated by the down-converting unit and obtain an image signal with the second resolution for display.

REFERENCE SIGNS LIST

10, 10A, 10B imaging device (camera system)
101 CPU
102 lens unit
103 imaging unit
104 imaging system correction circuit
105 gain adjustment circuit
106 knee/gamma correction circuit
107 output signal generation circuit (main line output)
108 down-converting circuit
109 output signal generation circuit (finder output)
110 edge detection circuit
111, 111A, 111B high frequency band edge detection circuit
121-0 In00 edge detection unit
121-1 In01 edge detection unit
121-2 In10 edge detection unit
121-3 In11 edge detection unit
122 down-converting unit
123 squaring circuit
124 selector
125-$h$ horizontal edge detection unit
125-$v$ vertical edge detection unit
126 selector
131 low-pass filter
132, 133 high-pass filter
134 α blending unit
135 coring unit
136 divider
137 band-pass filter
138 fast Fourier transform circuit
139 frequency selection circuit

The invention claimed is:

1. An image processing device, comprising:
circuitry configured to
generate filter coefficients used to extract edges in a high frequency band from a first image signal that has a first resolution and that is obtained from an imaging device, the filter coefficients being generated using lens information obtained from a lens unit and information used at a time of imaging,
generate first edge information having a second resolution by down-converting an edge information having the first resolution, the edge information having the first resolution being generated from the first image signal by a first filtering process based on the filter coefficients, the first resolution being higher than the second resolution,
generate second edge information having the second resolution from a second image signal by a second filtering process, the second image signal being generated by down-converting the first image signal having the first resolution to the first image signal having the second resolution,
generate third edge information for display by combining the first edge information with the second edge information, the third edge information being configured to visually distinguish the first edge information from the second edge information, and cause the third edge information to be displayed on a display by overlaying the third edge information on the second image.

2. The image processing device according to claim 1, wherein the display is a view finder.

3. The image processing device according to claim 1, wherein a color and brightness of each of the first, second, and third edge information are user adjustable.

4. The image processing device according to claim 1, wherein the lens information includes at least one of type number, zoom position, and F value.

5. The image processing device according to claim 1, wherein the information used at the time of imaging includes at least one of imaging parameters, correction parameters, and gain adjustment parameters.

6. The image processing device according to claim 1, wherein the filter coefficients include coefficients for α blending and high-pass filtering.

7. The image processing device according to claim 1, wherein the filter coefficients include coefficients for bandpass filtering.

8. The image processing device according to claim 1, wherein the filter coefficients includes Fast Fourier Transform (FFT) coefficients.

9. The image processing device according to claim 1, wherein the first filtering process includes high-pass filtering the first image signal.

10. The image processing device according to claim 1, wherein the first filtering process includes bandpass filtering the first image signal.

11. The image processing device according to claim 1, wherein the first filtering process includes performing a Fast Fourier Transform (FFT) on the first image signal.

12. The image processing device according to claim 1, wherein the first resolution is 4K resolution and the second resolution is HD resolution.

13. The image processing device according to claim 1, wherein the first resolution is 8K.

14. The image signal processing device according to claim 1, wherein the first resolution includes more than 3840 pixels in a horizontal direction and more than 2160 pixels in a vertical direction.

15. The image signal processing device according to claim 2, wherein the circuitry is further configured to:

reduce noise included in the first and second edge information, and control a coring level on the basis of imaging information, correction information, and gain information.

16. An image signal processing method, comprising:

generating, with circuitry, filter coefficients used to extract edges in a high frequency band from a first image signal that has a first resolution and that is obtained from an imaging device, the filter coefficients being generated using lens information obtained from a lens unit and information used at a time of imaging;

generating, with the circuitry, first edge information having a second resolution by down-converting an edge information having the first resolution, the edge information having the first resolution being generated from the first image signal by a first filtering process based on the filter coefficients, the first resolution being higher than the second resolution;

generating, with the circuitry, second edge information having the second resolution from a second image signal by a second filtering process, the second image signal being generated by down-converting the first image signal having the first resolution to the first image signal having the second resolution;

generating, with the circuitry, third edge information for display by combining the first edge information with the second edge information, the third edge information being configured to visually distinguish the first edge information from the second edge information; and causing, with the circuitry, the third edge information to be displayed on a display by overlaying the third edge information on the second image.

17. A non-transitory computer-readable medium encoded with computer-readable instructions that, when executed by processing circuitry, cause the processing circuitry to perform an image processing method, comprising:

generating filter coefficients used to extract edges in a high frequency band from a first image signal that has a first resolution and that is obtained from an imaging device, the filter coefficients being generated using lens information obtained from a lens unit and information used at a time of imaging;

generating first edge information having a second resolution by down-converting an edge information having the first resolution, the edge information having the first resolution being generated from the first image signal by a first filtering process based on the filter coefficients, the first resolution being higher than the second resolution;

generating second edge information having the second resolution from a second image signal by a second filtering process, the second image signal being generated by down-converting the first image signal having the first resolution to the first image signal having the second resolution;

generating third edge information for display by combining the first edge information with the second edge information, the third edge information being configured to visually distinguish the first edge information from the second edge information; and causing the third edge information to be displayed on a display by overlaying the third edge information on the second image.

* * * * *